United States Patent [19]

Takeuchi et al.

[11] Patent Number: 5,747,613

[45] Date of Patent: *May 5, 1998

[54] PROCESS FOR PRODUCING AROMATIC VINYL COMPOUND-BASED COPOLYMER

[75] Inventors: Mizutomo Takeuchi; Hajime Shouzaki; Norio Tomotsu, all of Ichihara, Japan

[73] Assignee: Idemitsu Kosan Co., Ltd., Tokyo, Japan

[ * ] Notice: The term of this patent shall not extend beyond the expiration date of Pat. No. 5,543,481.

[21] Appl. No.: 569,123

[22] PCT Filed: Jul. 1, 1994

[86] PCT No.: PCT/JP94/01079

§ 371 Date: Jan. 2, 1996

§ 102(e) Date: Jan. 2, 1996

[87] PCT Pub. No.: WO95/01379

PCT Pub. Date: Jan. 12, 1995

[30] Foreign Application Priority Data

Jul. 2, 1993 [JP] Japan ................... 5-164528

[51] Int. Cl.$^6$ ............... C08F 4/80; C08F 210/02
[52] U.S. Cl. .............. 526/134; 526/126; 526/128; 526/133; 526/135; 526/142; 526/144; 526/160; 526/164; 526/170; 526/347
[58] Field of Search .................. 526/134, 160, 526/347, 126, 128, 133, 140, 142, 144, 164, 170

[56] References Cited

U.S. PATENT DOCUMENTS 5,064,802 11/1991 Stevens et al. ............ 526/170 X
5,272,229 12/1993 Tomotsu et al. .
5,350,723 9/1994 Neithamer et al. ......... 526/170 X
5,430,001 7/1995 Tomotsu et al. .
5,461,128 10/1995 Takeuchi et al. .
5,543,481 8/1996 Takeuchi et al. ........... 526/106 X

FOREIGN PATENT DOCUMENTS

| 0 426 638 | 5/1991 | European Pat. Off. . |
| 0 492 282 | 7/1992 | European Pat. Off. . |
| 0 493 678 | 7/1992 | European Pat. Off. . |
| 0 502 683 | 9/1992 | European Pat. Off. . |
| 0 505 972 | 9/1992 | European Pat. Off. . |
| 0 505 973 | 9/1992 | European Pat. Off. . |
| 0 554 574 | 8/1993 | European Pat. Off. . |
| WO 93/03067 | 2/1993 | WIPO . |

*Primary Examiner*—Fred Teskin
*Attorney, Agent, or Firm*—Oblon, Spivak, McClelland, Maier & Neustadt, P.C.

[57] ABSTRACT

The present invention relates to a process for efficiently producing an aromatic vinyl compound-based copolymer having a high degree of syndiotactic configuration in its aromatic vinyl chain by copolymerizing an aromatic vinyl compound with an olefin, etc. in the presence of a catalyst comprising (A) a transition metal compound, (B) an ionic compound comprising a non-coordinate anion and a cation of a typical metal belonging to the group 4 and (C) a Lewis acid to be used as the case may be. It is made possible by the use of the highly active catalyst according to the above process to efficiently produce an aromatic vinyl compound-based copolymer which is minimized in residual amounts of ash and toxic substances a high degree of syndiotactic configuration in its aromatic vinyl chain, while dispensing with an expensive aluminoxane.

33 Claims, No Drawings

5,747,613

PROCESS FOR PRODUCING AROMATIC VINYL COMPOUND-BASED COPOLYMER

TECHNICAL FIELD

The present invention relates to a process for producing an aromatic vinyl compound-based copolymer. More particularly, it pertains to a process for efficiently producing an aromatic vinyl compound-based copolymer which is minimized in residual amounts of ash and toxic substances, maintains polymer performance at a high temperature and has a high degree of syndiotactic configuration in its aromatic vinyl chain by the use of a catalyst which has a high activity and favorable copolymerization properties and is free from deterioration of activity due to the by-production of a Lewis base such as an amine, while dispensing with an expensive aluminoxane.

BACKGROUND ART

It is known that olefinic polymers are produced in the presence of a catalyst system comprising Ziegler-Natta catalyst as a principal component. In recent years in particular there have been observed a number of processes for producing olefinic polymers in the presence of a soluble type catalyst comprising a transition metal compound and an aluminoxane as a co-catalyst. However, the aluminoxane, especially a highly active methylaluminoxane suffers the disadvantages that trimethylaluminum as a starting raw material is expensive and causes danger in the production process of an aluminoxane with the results that a methylaluminoxane becomes an expensive compound, and in a catalyst system containing the methylaluminoxane as a co-catalyst, a large amount of the aluminoxane is required in comparison with an transition metal compound, thereby inevitably increasing the production cost of the polymer.

With regard to a polymerization catalyst system without the use of such an expensive aluminoxane, it is reported that a metallocene cation complex which is formed by bringing a neutral metallocene into contact with an ionic compound containing an iron (III) cation possesses polymerization performance for an olefin such as ethylene. [Refer to Journal of the American Chemical Society (J. Am. Chem. Soc.) vol 108, page 7410 (1987)]. In the above-mentioned system in which an ionic compound containing a cation of iron (III) is used as an ionizing agent for the metallocene, a metallocene cation complex is formed by drawing a ligand through the utilization of the oxidation-reduction performance of an iron (III) cation with the reaction formula exemplified by the following.

wherein R is an alkyl group or the like, Cp is a cyclopentadienyl group, M is a metal and A is an anion.

When the above-mentioned reaction is put into practice under a polymerizaiton condition, a compound originating from the iron III cation remains in the resulting resin after the polymerization. The compound is sometimes responsible for the coloration of the resulting resin, thus impairing the properties inherent to the resin.

There is also disclosed a protonation method as an ionization method of a metallocene. (Refer to European Patent No. 277004.) This is a method for forming a metallocene cation by allowing a metallocene having a group capable of reacting with a proton to react with an ammonium salt having an active proton with the reaction formula exemplified by the following.

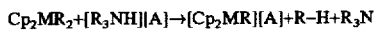

wherein R, Cp, M and A are each as previously defined.

There is formed in this reaction, as a by-product, a Lewis base (that is, an amine such as $R_3N$), which can be coordinated with the metallocene cation, thus deteriorating the catalytic activity. In addition, both the catalyst and a resin produced in the presence of the catalyst contain a toxic residual amine.

There is further disclosed a process for producing a metallocene cation by bringing an ionized ionic compound into contact with a neutral metallocene. (Refer to European Patent No. 426637.) By the term ionized ionic compound as used herein is meant an ionic compound containing a cation without an active proton, which compound is exemplified a by triphenylcarbenium cation.

In this reaction, as exemplified by the following reaction formula, a ligand is drawn from a metallocene by a carbenium ion to form a metallocene cation.

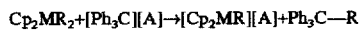

wherein R, Cp, M and A are each as previously defined and Ph is phenyl group.

In the aforesaid case, the by-produced $Ph_3C$—R is a polymerization solvent-like compound.

The conventional carbenium compound, however, is not highly soluble in a solvent with a low polarity which is used at the time of producing a polymer and besides is highly reactive with a chain transfer agent typified by an organoaluminum compound.

On the other hand, the present inventors previously proposed processes for producing a styrene/olefin-based copolymer and a styrene/diolefin-based copolymer. (Refer to Japanese Patent Application Laid-Open Nos. 7705/1991, 258811/1991 and 300904/1992.) The copolymers are improved in various aspects of physical properties, but involves some problems in that a large amount of ash remains in the product polymer, as mentioned hereinbefore, in the case of catalyst system comprising an aluminoxane as a co-catalyst; heavy metals such as iron (III) are left in the product polymer in the case of catalyst system comprising an ionic compound containing an iron (III) cation as an activating agent; and toxic amines remain in the cas of catalyst stytem comprising an ammonium salt.

In addition, it is impossible to efficiently produce an aromatic vinyl copolymer having a high degree of stereoregularity by the use of the catalyst system as indicated in the aforesaid European Patent No. 426637. Moreover, favorable copolymers can not be obtained in the foregoing prior arts.

Under such circumstances, it is an object of the present invention to provide a process for efficiently producing an aromatic vinyl compound-based copolymer which is minimized in residual amounts of ash and toxic substances, maintains polymer performance at a high temperature and has a high degree of syndiotactic configuration in its aromatic vinyl chain by the use of a catalyst which has a high activity and favorable copolymerization properties and is free from deterioration of activitty due to the by-production of a Lewis base such as an amine, while dispensing with an expensive aluminoxane.

DISCLOSURE OF THE INVENTION

As a result of intensive research and investigation accumulated by the present inventors in order to attain the foregoing object, it has been found that the foregoing object can be achieved by copolymerizing an aromatic vinyl compound and an olefin or the like by the use of a polymerization catalyst which comprises a transition metal compound, a specific ionic compound and a Lewis acid to be used as the case may be. The present invention has been accomplished on the basis of the aforestated finding and information.

Specifically, the present invention provides a process for producing an aromatic vinyl compound-based copolymer having a high degree of syndiotactic configuration in its aromatic vinyl chain which process comprises copolymerizing (a) an aromatic vinyl compound and (b) at least one compound selected from the group consisting of olefins, diolefins and alkynes in the presence of a polymerizaiton catalyst comprising (A) a transition metal compound, (B) an ionic compound comprising a non-coordinate anion and a cation of a typical metal belonging to the group 4 of the Periodic Table and (C) a Lewis acid to be used as the case may be.

THE MOST PREFERRED EMBODIMENT TO CARRY OUT THE INVENTION

In the process according to the present invention, there is employed, as the polymerization catalyst, the combination of (A) a transition metal compound, (B) an ionic compound comprising a non-coordinate anion and a cation of a typical metal belonging to the group 4 of the Periodic Table and (C) a Lewis acid to be used as the case may be. Various transition metal compounds are available as the component (A) and exemplified by a compound of a group 3 to 6 metal of the Periodic Table and a compound of lanthanum series metal, of which is preferable a compound of a group 4 metal (titanium, zirconium, hafnium, vanadium, etc.). Various titanium compounds can be used and a preferred example is at least one compound selected from the group consisting of titanium compounds and titanium chelate compounds represented by the general formula:

  (I)

or

  (II)

wherein $R^1$, $R^2$, $R^3$ and $R^4$ are each a hydrogen atom, an alkyl group having 1 to 20 carbon atoms, an alkoxyl group having 1 to 20 carbn atoms, a thioalkoxyl group having 1 to 20 carbon atoms, a thioaryloxyl group having 6 to 20 carbon atoms, an aryl group having 6 to 20 carbon atoms, an alkylaryl group, an arylalkyl group, an acyloxyl group having 1 to 20 carbon atoms, a cyclopentadienyl group, a substituted cyclopentadienyl group, an indenyl group or a halogen atom; a, b and c are each an integer from 0 to 4; and d and e are each an integer from 0 to 3.

$R^1$, $R^2$, $R^3$ and $R^4$ in the general formulae (I) and (II) each represent a hydrogen atom, an alkyl group having 1 to 20 carbon atoms (specifically, methyl group, ethyl group, propyl group, butyl group, amyl group, isoamyl group, isobutyl group, octyl group and 2-ethylhexyl group), an alkoxyl group having 1 to 20 carbon atoms (specifically, methoxyl group, ethoxyl group, propoxyl group, butoxyl group, amyloxyl group, hexyloxyl group, and 2-ethylhexyloxyl group), a thioalkoxyl group having 1 to 20 carbon atoms (specifically, thiomethoxyl group, a thioaryloxyl group having 6 to 20 carbon atoms (specifically, thiophenoxyl group), an aryl group, an alkylaryl group, an arylalkyl group each having 6 to 20 carbon atoms (specifically, phenyl group, tolyl group, xylyl group and benzyl group), an acyloxyl group having 1 to 20 carbon atoms (specifically, heptadecylcarbonyloxyl group), a cyclopentadienyl group, a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). These $R^1$, $R^2$, $R^3$, $R^4$ may be the same as or different from each other. Furthermore, a, b and c are each an integer from 0 to 4, and d and e are each an integer from 0 to 3.

More desirable titanium compounds include a mono (cyclopentadienyl)titanium compound, mono(indenyl) titanium compound and mono(fluorenyl)titanium compound represented by the formula (III)

  (III)

wherein $R^5$ represents a cyclopentadienyl group, a substituted cyclopentadienyl group, an indenyl group, a substituted indenyl group, a fluorenyl group, or the like; X, Y, and Z, independently of one another, are a hydrogen atom, an alkyl group having 1 to 12 carbon atoms, an alkoxyl group having 1 to 12 carbon atoms, a thioalkoxyl group having 1 to 20 carbon atoms an aryl group having 6 to 20 carbon atoms, an aryloxyl group having 6 to 20 carbon atoms, a thioaryloxyl group having 6 to 20 carbon atoms, an arylalkyl group having 6 to 20 carbon atoms, or a halogen atom.

The substituted cyclopentadienyl group represented by $R^5$ in the above formula is, for example, a cyclopentadienyl group substituted by at least one of an alkyl group having 1 to 6 carbon atoms, more specifically, methylcyclopentadienyl group, 1,3-dimethylcyclopentadienyl group, 1,2,4-trimethylcyclopentadienyl group, 1,2,3,4-tetramethylcyclopentadienyl group, trimethylsilylcyclopentadienyl group, 1,3-di(trimethylsilyl) cyclopentadienyl group, tert-butylcyclopentadienyl group, 1,3-di(tert-butyl)cyclopentadienyl group, pentamethylcyclopentadienyl group or the like. In addition, X, Y, and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxyl group having 1 to 12 carbon atoms (specifically, methoxyl group, ethoxyl group, propoxyl group, butoxyl group, amyloxyl group, hexyloxyl group, octyloxyl group and 2-ethylhexyloxyl group), a thioalkoxyl group having 1 to 20 carbon atoms (specifically, thiomethoxyl group), an aryl group having 6 to 20 carbon atoms (specifically, phenyl group and naphthyl group), an aryloxyl group having 6 to 20 carbon atoms (specifically, phenoxyl group), a thioaryloxyl group having 6 to 20 carbon atoms (specifically, thiophenol group), an arylalkyl group having 6 to 20 carbon atoms (specifically, benzyl group), or a halogen atom (specifically, chlorine, bromine, iodine and fluorine).

Specific examples of the titanium compound represented by the general formula (III) include cyclopentadienyltrimethyltitanium, cyclopentadienyltriethyltitanium, cyclopentadienyltripropyltitanium, cyclopentadienyltributyltitanium, methylcyclopentadienyltrimethyltitanium, 1,2-dimethylcyclopentadienyltrimethyltitanium, 1,2,4-trimethylcyclopentadienyltrimethyltitanium, 1,2,3,4-tetramethylcyclopentadienyltrimethyltitanium, pentamethylcyclopentadienyltrimethyltitanium, pentamethylcyclopentadienyltriethyltitanium, pentamethylcyclopentadienyltripropyltitanium, pentamethylcyclopentadienyltributyltitanium, cyclopentadienylmethyltitanium dichloride, cyclopentadienylethyltitanium dichloride, pentamethylcyclopentadienylmethyltitanium dichloride, pentamethylcyclopentadienylethyltitanium dichloride, cyclopentadienyldimethyltitanium monochloride, cyclopentadienyldiethyltitanium monochloride, cyclopentadienyltitanium trimethoxide, cyclopentadienyltitanium triethoxide, cyclopentadienyltitanium tripropoxide, cyclopentadienyltitanium triphenoxide, pentamethylcyclopentadienyltitanium trimethoxide, pentamethylcyclopentadienyltitanium triethoxide, pentamethylcyclopentadienyltitanium tripropoxide, pentamethylcyclopentadienyltitanium tributoxide, pentamethylcyclopentadienyltitanium triphenoxide, cyclopentadienyltitanium trichloride, pentamethylcycloentadienyltitanium trichloride, cyclopentadienylmethoxytitanium dichloride, cyclopentadienyldimethoxytitanium chloride, pentamethylcyclopentadienylmethoxytitanium dichloride, cyclopentadienyltribenzyltitanium, pentamethylcyclopentadienylmethyldiethoxytitanium, indenyltitanium trichloride, indenyltitanium trimethoxide, indenyltitanium triethoxide, indenyltrimethyltitanium, indenyltribenzyltitanium, pentamethylcyclopentadienyltitanium trithiomethoxide, and pentamethylcyclopentadienyltitanium trithiophenoxide.

Furthermore, a condensed titanium compound represented by the general formula (IV) may be used as the titanium compound.

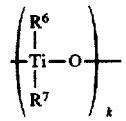

(IV)

wherein $R^6$ and $R^7$ each represent a halogen atom, an alkoxyl group having 1 to 20 carbon atoms or an acyloxyl group; and k is an integer from 2 to 20.

Furthermore, the above titanium compounds may be used in the form of a complex formed with an ester, an ether or the like.

The trivalent titanium compound represented by the formula (IV) typically includes a trihalogenated titanium such as titanium trichloride; and a cyclopentadienyltitanium compound such as cyclopentadienyltitanium dichloride, and also those obtained by reducing a tetravalent titanium compound. These trivalent titanium compounds may be used in the form of a complex formed with an ester, an ether or the like.

In addition, examples of the zirconium compound used as the transition metal compound include tetrabenzylzirconium, zirconium tetraethoxide, zirconium tetrabutoxide, bisindenylzirconium dichloride, triisopropoxyzirconium chloride, zirconium benzyldichloride and tributoxyzirconium chloride. Examples of the hafnium compound include tetrabenzylhafnium, hafnium tetraethoxide and hafnium tetrabutoxide. Examples of the vanadium compound include vanadyl bisacetylacetonato, vanadyl triacetylacetonato, vanadyl triethoxide and vanadyl tripropoxide. Of these transition metal compounds, the titanium compounds are particularly suitable.

Aside from the foregoing, the transition metal compounds constituting the component (A) of the catalyst include the transition metal compound with two ligands having conjugated π electrons, for example, at least one compound selected from the group consisting of the transition metal compounds represented by the general formula (V):

$$M^1R^8R^9R^{10}R^{11}$$ (V)

wherein $M^1$ is titanium, zirconium or hafnium; $R^8$ and $R^9$ are each a cyclopentadienyl group, substituted cyclopentadienyl group, indenyl group, or fluorenyl group; and $R^{10}$ and $R^{11}$ are each a hydrogen atom, a halogen atom, a hydrocarbon group having 1 to 20 carbon atoms, an alkoxyl group having 1 to 20 carbon atoms, an amino group or thioalkoxyl group having 1 to 20 carbon atoms, but $R^8$ and $R^9$ may be each crosslinked by a hydrocarbon group having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^8$ and $R^9$ in the general formula (V) designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl) cyclopentadienyl group; 1,2,4-tri(tert-butyl) cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and crosslinked by an alkylidene group having 1 to 5 carbon atoms, more specifically, methine group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^{10}$ and $R^{11}$ independently indicates, as described above but more specifically, a hydrogen atom; an alkyl group having 1 to 20 carbon atoms such as methyl group, ethyl group, propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxyl group, hexyloxyl group, octyloxyl group or 2-ethylhexyloxyl group; an aryloxyl group having 6 to 20 carbon atoms such as phenoxyl group; an amino group; or a thioalkoxyl group having 1 to 20 carbon atoms.

Specific examples of the transition metal compounds represented by the general formula (V) wherein $M^1$ is titanium include bis(cyclopentadienyl)dimethyltitanium; bis (cyclopentadienyl)diethyltitanium; bis(cyclopentadienyl) dipropyltitanium; bis(cyclopentadienyl)dibutyltitanium; bis (methylcyclopentadienyl)dimethyltitanium; bis(tert-butylcyclopentadienyl)dimethyltitanium; bis(1,3-dimethylcyclopentadienyl)dimethyltitanium; bis(1,3-di-tert-butylcyclopentadienyl)dimethyltitanium; bis(1,2,4-trimethylcyclopentadienyl)dimethyltitanium; bis(1,2,3,4-tetramethylcyclopentadienyl)dimethyltitanium; bis (cyclopentadienyl)dimethyltitanium; bis (trimethylsilylcyclopentadienyl)dimethyltitanium; bis(1,3-di(trimethylsilyl)cyclopentadienyl)dimethyltitanium; bis(1,2,4-tris(trimethylsilyl)cyclopentadienyl)dimethyltitanium; bis(indenyl)dimethyltitanium; bis(fluorenyl)

dimethyltitanium; methylenebis(cyclopentadienyl) dimethyltitanium; ethylidenebis(cyclopentadienyl) dimethyltitanium; methylenebis(2,3,4,5-tetramethylcyclopentadienyl)dimethyltitanium; ethylidenebis(2,3,4,5-tetramethylcyclopentadienyl) dimethyltitanium; dimethylsilylenebis(2,3,4,5-tetramethylcyclopentadienyl)dimethyltitanium; methylenebisindenyldimethyltitanium; ethylidenebisindenyldimethyltitanium; dimethylsilylenebisindenyldimethyltitanium; methylenebisfluorenyldimethyltitanium; ethylidenbisfluorenyldimethyltitanium; dimethylsilylenebisfluorenyldimethyltitanium; methylene(tert-butylcyclopentadienyl)(cyclopentadienyl)dimethyltitanium; methylene(cyclopentadienyl)(indenyl)dimethyltitanium; ethylidene(cyclopentadienyl)(indenyl)dimethyltitanium; dimethylsilylene(cyclopentadienyl)(indenyl) dimethyltitanium; methylene(cyclopentadienyl)(fluorenyl) dimethyltitanium; ethylidene(cyclopentadienyl)(fluorenyl) dimethyltitanium; dimethylsilylene(cyclopentadienyl) (fluorenyl)dimethyltitanium; methylene(indenyl)(fluorenyl) dimethyltitanium; ethylidene(indenyl)(fluorenyl) dimethyltitanium; dimethylsilylene(indenyl)(fluorenyl) dimethyltitanium; bis(cyclopentadienyl)dibenzyltitanium; bis(tert-butylcyclopentadienyl)dibenzyltitanium; bis (methylcyclopentadienyl)dibenzyltitanium; bis(1,3-dimethylcyclopentadienyl)dibenzyltitanium; bis(1,2,4-trimethylcyclopentadienyl)dibenzyltitanium; bis(1,2,3,4-tetramethylcyclopentadienyl)dibenzyltitanium; bis (pentamethylcyclopentadienyl)dibenzyltitanium; bis (trimethylsilylcyclopentadienyl)dibenzyltitanium; bis 1,3-di-(trimethylsilyl)cyclopentadienyl dibenzyltitanium; bis 1,2,4-tris(trimethylsilyl)cyclopentadienyldibenzyltitanium; bis(indenyl)dibenzyltitanium; bis(fluorenyl) dibenzyltitanium; methylenebis(cyclopentadienyl) dibenzyltitanium; ethylidenebis(cyclopentadienyl) dibenzyltitanium; methylenebis(2,3,4,5-tetramethylcyclopentadienyl)dibenzyltitanium; ethylidenebis(2,3,4,5-tetramethylcyclopentadienyl) dibenzyltitanium; dimethylsilylbis(2,3,4,5-tetramethylcyclopentadienyl)dibenzyltitanium; methylenebis(indenyl)dibenzyltitanium; ethylidenebis (indenyl)dibenzyltitanium; dimethylsilylbis(indenyl) dibenzyltitanium; methylenebis(fluorenyl)dibenzyltitanium; ethylidenebis(fluorenyl)dibenzyltitanium; dimethylsilylbis (fluorenyl)dibenzyltitanium; methylene(cyclopentadienyl) (indenyl)dibenzyltitanium; ethylidene(cyclopentadienyl) (indenyl)dibenzyltitanium; dimethylsilyl(cyclopentadienyl) (indenyl)dibenzyltitanium; methylene(cyclopentadienyl) (fluorenyl)dibenzyltitanium; ethylidene(cyclopentadienyl) (fluorenyl)dibenzyltitanium; dimethylsilyl (cyclopentadienyl)(fluorenyl)dibenzyltitanium; methylene (indenyl)(fluorenyl)dibenzyltitanium; ethylidene(indenyl) (fluorenyl)dibenzyltitanium; dimethylsilyl(indenyl) (fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium dipheoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl) titanium dimethoxide; bispentamethylcyclopentadienyltitanium dimethoxide; bis (trimethylsilylcyclopentadienyl)titanium dimethoxide; bis-1,3-di(trimethylsilyl)cyclopentadienyltitanium dimethoxide; bis[(1,2,4-tris(trimethylsilyl) cyclopentadienyl)]titanium dimethoxide; bisindenyltitanium dimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethylcyclopentadienyl)titanium dimethoxide; ethylidenebis(2,3,4,5-tetramethylcyclopentadienyl)titanium dimethoxide; dimethylsilylbis(2,3,4,5-tetramethylcyclopentadienyl) titanium dimethoxide; methylenebisindenyltitanium dimethoxide; methylenebis(methylindenyl)titanium dimethoxide; ethylidenebisindenyltitanium dimethoxide; dimethylsilylbisindenyltitanium dimethoxide; methylenebisfluorenyltitanium dimethoxide; methylenebis (methylfluorenyl)titanium dimethoxide; ethylidenebisfluorenyltitanium dimethoxide; dimethylsilylbisfluorenyltitanium dimethoxide; methylene (cyclopentadienyl)(indenyl)titanium dimethoxide; ethylidene(cyclopentadienyl)(indenyl)titanium dimethoxide; dimethylsilyl(cyclopentadienyl)(indenyl)titanium dimethoxide; methylene(cyclopentadienyl)(fluorenyl) titanium dimethoxide; ethylidene(cyclopentadienyl) (fluorenyl)titanium dimethoxide; dimethylsilyl (cyclopentadienyl)(fluorenyl)titanium dimethoxide; methylene(indenyl)(fluorenyl)titanium dimethoxide; ethylidene(indenyl)(fluorenyl)titanium dimethoxide; and dimethylsilyl(indenyl)(fluorenyl)titanium dimethoxide.

Examples of the transition metal compounds represented by the formula (V) wherein $M^1$ is zirconium include ethylidenebiscyclopentadienylzirconium dimethoxide and dimethylsilylbiscyclopentadienylzirconium dimethoxide. Examples of the hafnium compounds according to the general formula (V) include ethylidenebiscyclopentadienylhafnium dimethoxide, dimethylsilylbiscyclopentadienylhafnium dimethoxide, etc. Particularly desirable transition metal compounds among them are titanium compounds. In addition to the combinations of the above, the compound may be a bidentate coordination complex compound such as 2,2'-thiobis-( 4-methyl-6-tert-butylphenyl)titanium diisopropoxide; 2,2'-thiobis(4-methyl-6-tert-butylphenyl) titanium dimethoxide or the like.

Of these transition metal compounds according to the present invention, a transition metal compound having at least one π-ligand which is represented by the general formula (III) is preferable. Any of these transition metal compounds may be used alone or in combination with at least one other.

There are available various ionic compounds comprising a non-coordinate anion and a cation of a typical metal belonging to the group 4 of the Periodic Table to be used as the component (B). Examples of the non-coordinate anion include those represented by the following general formula (VI):

$$(M^2 X^1 X^2 \cdots X^n)^{(n-m)-} \qquad (VI)$$

wherein $M^2$ is a metal selected from the groups 5 to 15 of the Periodic Table; $X^1$ to $X^n$ are each a hydrogen atom, a dialkylamino group, an alkoxyl group, an aryloxyl group, an alkyl group having 1 to 20 carbon atoms, an aryl group (including a halogen-substituted aryl group), an alkylaryl group or an arylalkyl group, each having 6 to 20 carbon atoms, a substituted alkyl group, an organometalloid group or a halogen atom; m is the valency of $M^2$, indicating an integer of 1 to 7; and n is an integer of 2 to 8.

Specific examples of $M^2$ include B, Al, Si, P, As, Sb, etc. Specific examples of $X^1$ to $X^n$ include a dialkylamino group such as dimethylamino and dietylamino; an alkoxyl group such as methoxyl, ethoxyl and n-butoxyl; an aryloxyl group such as phenoxyl, 2,6-dimethylpheoxyl and naphthyloxyl; an alkyl group having 1 to 20 carbon atoms such as methyl, ethyl, n-propyl, isopropyl, n-butyl, n-octyl and 2-ethylhexyl; an aryl group, an alkylaryl group or an arylalkyl group each having 6 to 20 carbon atoms, such as phenyl, p-tolyl, benzyl, mono-pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; an halogen atom such as F, Cl, Br and I; and an organometalloid such as pentamethylantimony group, trimethylsilyl group, trimethylgermyl group, diphenylarsine group, dicyclohexylantimony group and diphenylboron group.

Specific examples of the anion include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $BF_4^-$, $PF_6^-$, $P(C_6F_5)_6^-$ and $Al(C_6HF_4)_4^-$.

On the other hand, various cations of a typical metal belonging to the group 4 of the Periodic Table are available and are preferably exemplified by those represented by the general formula (VII):

$$M^3R^{12}R^{13}R^{14} \quad \text{(VII)}$$

wherein $M^3$ is a typical metal belonging to the group 4 and is specifically exemplified by C, Si, Ge, etc., among which C and Si are preferable; $R^{12}$, $R^{13}$ and $R^{14}$ are each hydrogen atom, an alkyl group having 1 to 20 carbon atoms, an aryl group having 6 to 20 carbon atoms, an alkoxyl group having 1 to 20 carbon atoms or a thioalkoxyl group having 1 to 20 carbon atoms, and may be the same or different.

Specific examples of the above-mentioned cations include triphenylcarbenium, tri(toluyl)carbenium, tri(methoxyphenyl)carbenium, tri(chlorophenyl)carbenium, tri(fluorophenyl)carbenium, tri(xylyl)carbenium, [di(toluyl)phenyl carbeniunm, [di(methoxyphenyl)phenyl]carbenium, [di(chlorophenyl)phenyl]carbenium, [toluyldi(phenyl)]carbenium, [methoxyphenyldi(phenyl)]carbenium, [chlorophenyldi(phenyl)]carbenium, triphenylsilyl cation, trimethoxysilyl cation, tri(thioisopropyl) silyl cation, trimethylsilyl cation, tri(methoxyphenyl)silyl cation, tri(toluyl) silyl cation, tri(chlorophenyl)silyl cation, etc.

As the above-mentioned ionic compound, those in which the non-coordinate anion is tetrakis(pentafluorophenyl)borate are particularly preferable, and are specifically exemplified by triphenylcarbenium tetrakis(pentafluorophenyl)borate; 4,4',4"-tri(methoxyphenyl)carbenium tetrakis(pentafluorophenyl)borate, tri(toluyl)carbenium tetrakis(pentafluorophenyl)borate, 4,4',4"-tri(chlorophenyl)carbenium tetrakis(pentafluorophenyl)borate, triphenylsilyl tetrakis(pentafluorophenyl)borate, trimethoxysilyl tetrakis(pentafluorophenyl)borate tri(thioisopropyl)silyl tetrakis(pentafluorophenyl) borate, trimethylsilyl tetrakis(pentafluorophenyl)borate, 4,4',4"-tri(methoxyphenyl)silyl tetrakis(pentafluorophenyl)borate, tri(toluyl)silyl tetrakis(pentafluorophenyl)borate, 4,4',4"-tri(chlorophenyl)silyl tetrakis(pentafluorophenyl)borate, etc.

In the polymerization catalyst to be used in the present invention, the aforestated ionic compound as the component (B) may be used alone or in combination with at least one other.

The Lewis acid to be used according to demand as the component (C) in the foregoing polymerization catalyst is an alkyl group-containing compound, which is exemplified by a variety of compounds such as the aluminum compound having an alkyl group represented by the general formula (VIII)

$$R^{15}Al(OR^{16})_qX^1_{3-p-q} \quad \text{(VIII)}$$

wherein $R^{15}$ and $R^{16}$ are each an alkyl group having 1 to 8, preferably 1 to 4 carbon atoms, $X^1$ is a hydrogen atom or a halogen atom, p satisfies the relation $0<p\leq 3$, desirably p=2 or 3, most desirably p=3, and q satisfies the relation $0<q\leq 3$ desirably q=0 or 1; the magnesium compound having an alkyl group represented by the general formula (IX)

$$R^{15}_2Mg \quad \text{(IX)}$$

wherein $R^{15}$ is as previously defined; the zinc compound having an alkyl group represented by the general formula (X)

$$R^{15}_2Zn \quad \text{(X)}$$

wherein $R^{15}$ is as previously defined; and the like.

The aboresaid compound having an alkyl group are preferably aluminum compounds having an alkyl group, more desirably trialkylamluminium compounds and dialkylaluminum compounds. Examples of such compounds include trialkylaluminum such as trimethylaluminum, triethylaluminum, tri-n-propylaluminum, triisopropylaluminum, tri-n-butyl-aluminum, triisobutylaluminum and tri-tert-butylaluminu; dialkylaluminum halide such as dimethylaluminum chloride, diethylaluminum chloride, di-n-propylaluminum chloride, diisopropylaluminum chloride, di-n-butylaluminum chloride, diisobutylaluminum chloride and di-tert-butylaluminum chloride; dialkylaluminum alkoxide such as dimethylaluminum methoxide and dimethylaluminum ethoxide; dialkylaluminum hydride such as dimethylaluminum hydride, diethylaluminum hydride and diisobutylaluminum hydride, dialkylmagensium such as dimethylmagnesium, diethylmagnesium, di-n-propylmagnesium and diisopropylmagnesium; and dialkylzinc such as dimethylzinc, diethylzinc, di-n-propylethylzinc and diisopropylzinc, and the like.

In the polymerization catalyst to be used in the present invention, any of the aforesaid Lewis acid as the component (C) may be used alone or in combination with at least one other.

The polymerization catalyst to be used in the present invention, which comprises the above-mentioned comonents (A) and (B) or the components (A), (B) and (C) as the principal components, can be incorporated with other catalyst component in addition thereto. The blending proportions of the components (A) and (B) or the components (A), (B) and (C) in the catalyst vary depending upon various conditions and thus can not unequivocally be determined. However, the molar ratio of the component (A) to the component (B) is usually 1:10 to 10:1 and the molar ratio of the component (A) to the component (C) is usually 1:0.01 to 1:1000.

In the present invention, an aromatic vinyl compound-based copolymer is produced by polymerizing (a) an aromatic vinyl compound along with (b) at least one member selected from the group consisting of olefins, diolefins and alkynes in the presence of the foregoing polymerization catalyst.

Examples of the aromatic vinyl compound as the aforesaid monomer component (a) include styrene; p-methylstyrene; o-methylstyrene; m-methylstyrene; 2,4-dimethylstyrene; 2,5-dimethylstyrene; 3,4-dimethylstyrene; 3,5-dimethylstyrene; p-tertiary-butylstyrene; p-chlorostyrene; m-chlorostyrene; o-chlorostyrene; p-bromostryrene; m-bromostyrene; o-bromostyrene;

p-fluorostyrene; m-fluorostyrene; o-fluorostyrene and o-methyl-p-fluorostyrene; divinylbenzene; p-isopropenylstyrene; 4-vinylbiphenyl; 3-vinylbiphenyl; 2-vinylbiphenyl, etc. Any of these aromatic vinyl compounds may be used alone or in combination with at least one other.

Examples of the olefin as the monomer component (b) include α-olefins such as ethylene; propylene; butene-1; pentene-1; hexene-1; heptene-1; octene-1; nonene-1; decene-1; 4-phenylbutene-1; 6-phenylhexene-1; 3-methylbutene-1; 4-methylpentene-1; 3-methylpentene-1; 3-methylhexene-1; 4-methylhexene-1; 5-methylhexene-1; 3,3-dimethylpentene-1; 3,4-dimethylpentene-1; 4,4-dimethylpentene-1; vinylcyclohexane; and vinylcyclohexene, halogen-substituted α-olefins such as hexafluoropropene; tetrafluoroethylene; 2-fluoropropene; fluoroethylene; 1,1-difluoroethylene; 3-fluoropropene; trifluoroethylene; and 3,4-dichlorobutene-1, cyclic olefins such as cyclopentene; cyclohexene; norbornene; 5-methylnorbornene; 5-ethylnorbornene; 5-propylnorbornene; 5,6-dimethylnorbornene; 1-methylnorbornene; 7-methylnorbornene; 5,5,6-trimethylnorbornene; 5-phenylnorbornene; and 5-benzylnorbornene. Examples of the diolefin include straight chain diolefins such as butadine; isoprene; and 1,6-hexadiene, and cyclic diolefins such as norbornadiene; 5-ethylidenenorbornene; 5-vinylnorbornene; and dicyclopentadiene. Examples of the alkynes include acetylene, methylacetylene, phenylacetylene and trimethylsilylylacetylene. The monomer component (b) may be used alone or in combination with at least one other.

In the present invention, the aromatic vinyl compound as the component (a) and the monomer as the component (b) can be polymerized under arbitrary mixing in conditions. It is also possible to polymerize any one of the monomers (a) and (b) and then polymerize the resultant prepolymer with the other monomer added thereafter, that is, in multi-stage.

The method of adding each of the components of the above-mentioned polymerization catalyst to the reaction system in the process accordingg to the present invention is not specifically limited, but includes, for example, ① a method in which each of the components is added separately to the system and brought into contact with the aforesaid raw monomer material; ② a method in which the reaction product of the components (A) and (B) is added to the system and brought into contact with the raw monomer material; ③ a method in which the reaction product of any two components from among the components (A), (B) and (C) is incorporated with the remaining component and the resultant mixture is brought into contact with the raw monomer material (more specifically, the reaction product of the components (A) and (B) is incorporated with the component (C) and the resultant mixture is brought into contact with the raw monomer material, or the reaction product of the components (A) and (C) is incorporated with the component (B) and the resultant mixture is brought into contact with the raw monomer material); ④ a method in which the reaction product of the components (A), (B) and (C) is added to the system and brought into contact with the raw monomer material; and the like methods. There may be used the reaction product of the components (A) and (B) which has been isolated and purified in advance.

The copolymerization according to the present invention may be carried out without specific limitation, by any of the methods including bulk polymerization, solution polymerization and suspension polymerization. Examples of the usable solvent in copolymerization include an aliphatic hydrocarbon exemplified by pentane, hexane, heptane and decane; an alicyclic hydrocarbon exemplified by cyclohexane; and an aromatic hydrocarbon exemplified by benzene, toluene and xylene. The polymerization temperature is not specifically limited, but is usually selected in the range of 0° to 100° C., preferably 10° to 70° C. The polymerization time is about 5 minutes to 24 hours, preferably at least one hour.

For the purpose of modifying the molecular weight of the aromatic vinyl compound-based copolymer to be produced, it is effective to proceed with the polymerization reaction in the presence of hydrogen.

The aromatic vinyl compound-based copolymer obtained by the process according to the present invention has a high degree of syndiotactic configuration in its aromatic vinyl chain, and may be incorporated with a copolymer of other structure and a homopolymer.

In addition, an aromatic vinyl compound-based copolymer can be produced by a method in which the copolymer after the polymerization is subjected, as necessary, to deashing treatment with a cleaning liquid containing hydrochloric acid or the like, further to cleaning and drying under reduced pressure, and is washed with a solvent such as methyl ethyl ketone (MEK) to remove MEK-soluble components.

Here, the aromatic vinyl compound-based copolymer which has a high degree of the syndiotactic configuration means that its stereochemical structure is mainly the syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The aromatic vinyl compound-based copolymers having such a high degree of syndiotactic configuration" as mentioned in the present invention means the copolymer having such a syndiotacticity that the proportion of racemic diad is at least 75%, preferably at least 85%, or the proportion of racemic pentad is at least 30%, preferably at least 50% in the aromatic vinyl chain. However, the degree of the syndiotacticity varies to some extent depending on the type of the substituent group and the proportion of the repeating units contained in the copolymer.

In the following, the present invention will be described in more detail with reference to examples, which however, shall not be construed to limit the present invention thereto.

EXAMPLE 1

In an atmosphere of dried nitrogen, 5.0 g of 4,4',4"-trimethoxytrityl alcohol was dissolved in 10 mL (milliliter) of dried toluene, to the resultant solution was added dropwise, under ice cooling, 2.0 mL of thionyl chloride and the mixture thus formed was allowed to react at an elevated temperature under refluxing for 6 hours. After the reaction, the reaction mixture was allowed to cool to 40° C., where 20 mL of hexane was added thereto to precipitate 4,4',4"-trimethoxytrityl chloride. The crude crystal was recrystallized from cooled mixed solvent of toluene/hexane in ½ ratio by weight to produce 4.8 g of 4,4',4"-trimethoxytrityl chloride.

In an atmosphere of dried nitrogen, 4.5 mmol of 4,4',4"-trimethoxytrityl chloride was dissolved in 30 mL of dried methylene chloride, and the resultant solution was added dropwise to 60 mL of methylne chloride containing 4.0 g of lithium tetrakis(pentafluorophenyl)borate. After one hour of stirring at room temperature, the product was filtered with a glass filter in an atmosphere of dried nitrogen, and the filtrate was concentrated to 50 mL. The resultant concentrate was gradually added dropwise in 450 mL of dried hexane to produce 4,4',4"-trimethoxyphenylcarbenium tetrakis (pentafluorophenyl)borate in the form of red solid. The compound thus obtained was dissolved in toluene to prepare 10 mmol/L red homogeneous solution.

[Preparation of Polymerization Catalyst]

One mL of 2 mol/L solution of triisobutylaluminum in toluene was diluted with 13 mL of toluene and was incorporated with 5 mL of 10 mmol/L solution of 1,2,3,4-tetramethylcyclopentadienyltitanium trimethoxide in toluene with stirring at room temperature for 15 minutes. The resultant mixture was mixed with 6 mL of solution of the above-prepared 4,4',4"-trimethyoxyphenylcarbenium tetrakis(pentafluorophenyl)borate in toluene at room temperature in an atmosphere of nitrogen to prepare a catalyst.

[Polymerization]

Dried styrene in an amount of 400 mL placed in a 1 L sus-made autoclave was heated to 50° C., incorporated with 0.1 mL of 2 mol/L solution of triisobutylaluminum in toluene with stirring for 10 minutes, and thereafter incorporated with 20 mL of the above-prepared catalyst solution in a stream of nitrogen. Subsequently, ethylene was continuously introduced into the autoclve so as to attain a constant partial pressure of ethylene being 8 kg/cm$^2$ to effect polymerization reaction for 2 hours. After the unreacted ethylene was discharged, methanol was added in the reaction system to arrest the reaction. The content in the autoclave was washed with 2 L of methanol, and the precipitate was collected by filtration and dried under reduced pressure to recover 45.7 g of polymer.

5.02 g of the polymer was subjected to Soxhlet extraction for 5 hours by the use of methyl ethyl ketone to recover 4.06 g of objective polymer as the insoluble portion. There were observable, in the methyl ethyl ketone-insoluble polymer, a melting point of 120° C. assigned to polyethylene segment and a melting point of 261° C. assigned to syndiotactic polystyrene segment. The analysis by $^{13}$C-NMR spectrum proved that 90% of the styrenic segment was of syndiotactic configuration and the ethylenic segment was a linear polymer. The objective polymer had a molar ratio of styrene unit/ethylene unit of 88/12 and an intrinsic viscosity [η] of 0.48 dL as measured in trichlorobenzene at 135° C.

EXAMPLE 2

[Preparation of Polymerization Catalyst]

The procedure in Example 1 was repeated to prepare catalyst solution except that pentamethylcyclopentadienyltrimethyltitanium was used in place of the 1,2,3,4-tetramethylcyclopentadienyltitanium trimethoxide. The solution thus obtained was brown homogeneous solution.

[Polymerization]

The procedure in Example 1 was repeated except that the polymerization temperature was set to 70° C. and 10 mL of the above-prepared catalyst solution was used. As a result, there was obtained 12.1 g of polymer, which was subjected to Soxhlet extraction by the use of methyl ethyl ketone with the result that the extraction rate was 13%. The methyl ethyl ketone-insoluble portion had a melting point of 119° C. assigned to polyethylene segment and that of 268° C. assigned to polystyrene segment. The objective polymer had a molar ratio of styrene unit/ethylene unit of 91/9, and an intrinsic viscosity [η] of 0.56 dL as measured in trichlorobenzene at 135° C.

EXAMPLE 3

[Preparation of Polymerization Catalyst]

The procedure in Example 1 was repeated to prepare catalyst solution except that 1-benzyl-2,3,4,5-tetramethylcyclopentadienyltitanium trimethoxide was used in place of the 1,2,3,4-tetramethylcyclopentadienyltitanium trimethoxide. The solution thus obtained was brown homogeneous solution.

[Polymerization]

The procedure in Example 1 was repeated except that the above-prepared catalyst solution was used. As a result, there was obtained 4.5 g of polymer, which was subjected to Soxhlet extraction by the use of methyl ethyl ketone with the result that the extraction rate was 31%. The methyl ethyl ketone-insoluble portion had a melting point of 125° C. assigned to polyethylene segment and that of 269° C. assigned to polystyrene segment. The objective polymer had a molar ratio of styrene unit/ethylene unit of 34/66, and an intrinsic viscosity [η] of 1.20 dL as measured in trichlorobenzene at 135° C.

EXAMPLE 4

[Preparation of Polymerization Catalyst]

The procedure in Example 1 was repeated to prepare catalyst solution except that 1-(4'-methylphenyl)-2,3,4,5-tetramethylcyclopentadienyltitanium trimethoxide was used in place of the 1,2,3,4-tetramethylcyclopentadienyltitanium trimethoxide. The solution thus obtained was brown homogeneous solution.

[Polymerization]

The procedure in Example 1 was repeated except that the above-prepared catalyst solution was used. As a result, there was obtained 5.4 g of polymer, which was subjected to Soxhlet extraction by the use of methyl ethyl ketone with the result that the extraction rate was 23%. The methyl ethyl ketone-insoluble portion had a melting point of 125° C. assigned to polyethylene segment and that of 264° C. assigned to polystyrene segment. The objecttive polymer had a molar ratio of styrene unit/ethylene unit of 67/33, and an intrinsic viscosity [η] of 1.00 dL as measured in trichlorobenzene at 135° C.

EXAMPLE 5

[Preparation of Polymerization Catalyst]

The procedure in Example 1 was repeated to prepare catalyst solution except that pentamethylcyclopentadienyltitanium trimethoxide was used in place of the 1,2,3,4-tetramethylcyclopentadienyltitanium trimethoxide.

[Polymerization]

The procedure in Example 1 was repeated except that the above-prepared catalyst solution was used. As a result, there was obtained 22.2 g of polymer, which was subjected to Soxhlet extraction by the use of methyl ethyl ketone with the result that the extraction rate was 16%. The methyl ethyl ketone-insoluble portion had a melting point of 124° C. assigned to polyethylene segment and that of 264° C. assigned to polystyrene segment. The objective polymer had a molar ratio of styrene unit/ethylene unit of 54/46, and an intrinsic viscosity [η] of 0.77 dL as measured in trichlorobenzene at 135° C.

EXAMPLE 6

[Preparation of Polymerization Catalyst]

The procedure in Example 1 was repeated to prepare catlayst solution except that 1-ethyl-2,3,4,5-tetramethylcyclopentadienyltitanium trimethoxide was used in place of the 1,2,3,4-tetramethylcyclopentadienyltitanium trimethoxid.

[Polymerization]

The procedure in Example 1 was repeated except that the above-prepared catalyst solution was used. As a result, there was obtained 14.9 g of polymer, which was subjected to Soxhlet extraction by the use of methyl ethyl ketone with the result that the extraction rate was 15%. The methyl ethyl ketone-insoluble portion had a melting point of 120° C. assigned to polyethylene segment and that of 264° C. assigned to polystyrene segment. The objective polymer had a molar ratio of styrene unit/ethylene unit of 57/43, and an intrinsic viscosity [η] of 0.82 dL as measured in trichlorobenzene at 135° C.

EXAMPLE 7

[Polymerization]

The procedure in Example 5 was repeated except that the polymerization temperature was set to 30° C. As a result, there was obtained 20.8 g of polymer, which was subjected to Soxhlet extraction by the use of methyl ethyl ketone with the result that the extraction rate was 10%. The methyl ethyl keotn-insoluble portion had a melting point of 126° C. assigned to ethylene chain and that of 260° C. assigned to styrene chain. The objective polymer had a molar ratio of styrene unit/ethylene unit of 64/36, and an intrinsic viscosity [η] of 1.14 dL as measured in trichlorobenzene at 135° C.

EXAMPLE 8

[Polymerization]

The procedure in Example 1 was repeated except that the polymerization temperature was set to 30° C. As a result, there was obtained 19.8 g of polymer, which was subjected to Soxhlet extraction by the use of methyl ethyl ketone with the result that the extraction rate was 24%. The methyl ethyl ketone-insoluble portion had a melting point of 120° C. assigned to ethylene chain and that of 260° C. assigned to styrene chain. The objective polymer had a molar ratio of styrene unit/ethylene unit of 58/42, and an intrinsic viscosity [η] of 0.83 dL as measured in trichlorobenzene at 135° C.

EXAMPLE 9

[Preparation of Polymerization Catalyst]

0.2 mL of 2 mol/L solution of triisobutylaluminum in toluene was diluted with 14.8 mL of toluene and was incorporated with 5 mL of 10 mmol/L solution of 1,2,3,4-tetramethylcyclopentadienyltitanium trimethoxide in toluene with stirring at room temperature for 60 minutes. The resultant mixture was mixed with 5 mL of solution of the above-prepared 4,4',4"-trimethoxyphenylcarbenium tetrakis (pentafluorophenyl)borate in toluene at room temperature in an atmosphere of nitrogen to prepare a catalyst.

[Polymerization]

The procedure in Example 1 was repeated except that 10 mL of the above-prepared catalyst solution was used. As a result, there was obtained 8.3 g of polymer, which was subjected to Soxhlet extraction by the use of methyl ethyl ketone with the result that the extraction rate was 62%. The methyl ethyl ketone-insoluble portion had a melting point of 123° C. assigned to ethylene chain and that of 263° C. assigned to styrene chain. The objective polymer had a molar ratio of styrene unit/ethylene unit of 40/60, and an intrinsic viscosity [η] of 0.93 dL as measured in trichlorobenzene at 135° C.

INDUSTRIAL APPLICABILITY

The polymerization catalyst to be used in the process according to the present invention has a high activity and is free from deterioration of activity due to the by-production of a Lewis base such as an amine without the use of an expensive aluminoxane. It is made possible by the use of the above-mentioned catalyst to efficiently produce an aromatic vinyl compound-based copolymer which is minimized in residual amounts of ash and toxic substances, maintains polymer performance at a high temperature and has a high degree of syndiotactic configuration in its aromatic vinyl chain.

We claim:

1. A process for producing an aromatic vinyl compound-based copolymer comprising:
    copolymerizing (a) an aromatic vinyl compound and (b) at least one compound selected from the group consisting of olefins, diolefins and alkynes in the presence of a polymerization catalyst comprising (A) a transition metal compound and (B) an ionic compound comprising a non-coordinate anion and a cation,
    wherein said cation is selected from the group consisting of tri(toluyl)carbenium, tri(methoxyphenyl)carbenium, tri(chlorophenyl)carbenium, tri(fluorophenyl)carbenium, tri(xylyl)carbenium, [di(toluyl)phenyl] carbenium, [di(methoxyphenyl)phenyl]carbenium, [di(chlorophenyl)phenyl]carbenium, [toluyldi(phenyl)] carbenium, [methoxyphenyldi(phenyl)]carbenium, and [chlorophenyldi(phenyl)]carbenium.

2. A process for producing an aromatic vinyl compound-based copolymer comprising:
    copolymerizing (a) an aromatic vinyl compound and (b) at least one compound selected from the group consisting of olefins, diolefins and alkynes in the presence of a polymerization catalyst comprising (A) a transition metal compound and (B) an ionic compound comprising a non-coordinate anion and a cation, and (c) a Lewis acids
    wherein said cation is selected from the group consisting of tri(toluyl)carbenium, tri(methoxyphenyl)carbenium, tri(chlorophenyl)carbenium, tri(fluorophenyl) carbenium, tri(xylyl)carbenium, [di(toluyl)phenyl] carbenium, [di(methoxyphenyl)phenyl]carbenium, [di(chlorophenyl)phenyl]carbenium, [toluyldi(phenyl)] carbenium, [methoxyphenyldi(phenyl)]carbenium, and [chlorophenyldi(phenyl)]carbenium.

3. The process for producing an aromatic vinyl compound-based copolymer according to claim 1 wherein said transition metal compound (A) is a transition metal compound having a π-ligand.

4. The process for producing an aromatic vinyl compound-based copolymer according to claim 3 wherein said transition metal compound having a π-ligand is at least one member selected from the group consisting of mono-cyclopentadienyltitanium compound, mono-indenyltitanium compound and mono-fluorenyltitanium compound.

5. The process for producing an aromatic vinyl compound-based copolymer according to claim 1 wherein said transition metal compound (A) is a compound of a metal belonging to any of the groups 3 to 6 of the Periodic Table.

6. The process for producing an aromatic vinyl compound-based copolymer according to claim 1 wherein said transition metal compound (A) is a compound of any of lanthanum series metals.

7. The process for producing an aromatic vinyl compound-based copolymer according to claim 1 wherein said transition metal compound (A) is a transition metal compound having two ligands bearing conjugated π-electrons.

8. The process for producing an aromatic vinyl compound-based copolymer according to claim 2, wherein said transition metal compound (A) is a transition metal compound having a π-ligand.

9. The process for producing an aromatic vinyl compound-based copolymer according to claim 2, wherein said transition metal compound (A) is a compound of a metal belonging to any of the groups 3 to 6 of the Periodic Table.

10. The process for producing an aromatic vinyl compound-based copolymer according to claim 2, wherein said transition metal compound (A) is a compound of any of the lanthanum series metals.

11. The process for producing an aromatic vinyl compound-based copolymer according to claim 2, wherein said transition metal compound (A) is a transition metal compound having two ligands bearing conjugated π-electrons.

12. A process for producing an aromatic vinyl compound-based copolymer comprising:

copolymerizing (a) an aromatic vinyl compound and (b) at least one compound selected from the group consisting of olefins, diolefins and alkynes in the presence of a polymerization catalyst comprising (A) a transition metal compound and (B) an ionic compound comprising a non-coordinate anion and a cation, wherein said cation is selected from the group consisting of triphenylsilyl cation, trimethoxysilyl cation, tri(thioisopropyl)silyl cation, trimethylsilyl cation, tri(methoxyphenyl)silyl cation, tri(toluyl)silyl cation and tri(chlorophenyl)silyl cation.

13. A process for producing an aromatic vinyl compound-based copolymer comprising:

copolymerizing (a) an aromatic vinyl compound and (b) at least one compound selected from the group consisting of olefins, diolefins and alkynes in the presence of a polymerization catalyst comprising (A) a transition metal compound and (B) an ionic compound comprising a non-coordinate anion and a cation, and (c) a Lewis acid, wherein said cation is selected from the group consisting of triphenylsilyl cation, trimethoxysilyl cation, tri(thioisopropyl)silyl cation, trimethylsilyl cation, tri(methoxyphenyl)silyl cation, tri(toluyl)silyl cation and tri(chlorophenyl)silyl cation.

14. The process of claim 1, wherein said ionic compound (B) is at least one selected from the group consisting of 4,4',4"-tri(methoxyphenyl)carbenium tetrakis(pentafluorophenyl)borate, tri(toluyl)carbenium tetrakis(pentafluorophenyl)borate, and 4,4',4"-tri(chlorophenyl)carbenium tetrakis(pentafluorophenyl)borate.

15. The process of claim 12, wherein said ionic compound (B) is at least one selected from the group consisting of triphenylsilyl tetrakis(pentafluorophenyl)borate, trimethoxysilyl tetrakis(pentafluorophenyl)borate, tri(thioisopropyl)silyl tetrakis(pentafluorophenyl)borate, trimethylsilyl tetrakis(pentafluorophenyl)borate, 4,4',4"-tri(methoxyphenyl)silyl tetrakis(pentafluorophenyl)borate, tri(toluyl)silyl tetrakis(pentafluorophenyl)borate and 4,4',4"-tri(chlorophenyl)silyl tetrakis(pentafluorophenyl)borate.

16. The process of claim 2, wherein said ionic compound (B) is at least one selected from the group consisting of 4,4',4"-tri(methoxyphenyl)carbenium tetrakis(pentafluorophenyl)borate, tri(toluyl)carbenium tetrakis(pentafluorophenyl)borate, and 4,4',4"-tri(chlorophenyl)carbenium tetrakis(pentafluorophenyl)borate.

17. The process of claim 13, wherein said ionic compound (B) is at least one selected from the group consisting of triphenylsilyl tetrakis(pentafluorophenyl)borate, trimethoxysilyl tetrakis(pentafluorophenyl)borate, tri(thioisopropyl)silyl tetrakis(pentafluorophenyl)borate, trimethylsilyl tetrakis(pentafluorophenyl)borate, 4,4',4"-tri(methoxyphenyl)silyl tetrakis(pentafluorophenyl)borate, tri(toluyl)silyl tetrakis(pentafluorophenyl)borate, and 4,4',4"-tri(chlorophenyl)silyl tetrakis(pentafluorophenyl)borate.

18. The process of claim 1, wherein said aromatic vinyl compound-based copolymer has a high degree of syndiotactic configuration wherein the proportion of racemic diad is at least 75% or the proportion of racemic pentad is at least 30%.

19. The process of claim 2, wherein said aromatic vinyl compound-based copolymer has a high degree of syndiotactic configuration wherein the proportion of racemic diad is at least 75% or the proportion of racemic pentad is at least 30%.

20. The process of claim 12, wherein said aromatic vinyl compound-based copolymer has a high degree of syndiotactic configuration wherein the proportion of racemic diad is at least 75% or the proportion of racemic pentad is at least 30%.

21. The process of claim 13, wherein said aromatic vinyl compound-based copolymer has a high degree of syndiotactic configuration wherein the proportion of racemic diad is at least 75% or the proportion of racemic pentad is at least 30%.

22. The process of claim 2, wherein said Lewis acid (c) is triisobutyl aluminum and said transition metal compound (A) is pentamethylcyclopentadienyl trimethyltitanium.

23. The process of claim 13, wherein said Lewis acid (c) is triisobutyl aluminum and said transition metal compound (A) is pentamethylcyclopentadienyl trimethyltitanium.

24. The process of claim 12, wherein said transition metal compound (A) is a transition metal compound having a π-ligand.

25. The process of claim 13, wherein said transition metal compound (A) is a transition metal compound having a π-ligand.

26. The process of claim 24, wherein said transition metal compound having a π-ligand is at least one member selected from the group consisting of mono-cyclopentadienyltitanium compound, mono-indenyltitanium compound and mono-fluorenyltitanium compound.

27. The process of claim 25, wherein said transition metal compound having a π-ligand is at least one member selected from the group consisting of mono-cyclopentadienyltitanium compound, mono-indenyltitanium compound and mono-fluorenyltitanium compound.

28. The process of claim 12, wherein said transition metal compound (A) is a compound of a metal belonging to any of the groups 3 to 6 of the Periodic Table.

29. The process of claim 13, wherein said transition metal compound (A) is a compound of a metal belonging to any of the groups 3 to 6 of the Periodic Table.

30. The process of claim 12, wherein said transition metal compound (A) is a compound of any of lanthanum series metals.

31. The process of claim 13, wherein said transition metal compound (A) is a compound of any of lanthanum series metals.

32. The process of claim 12, wherein said transition metal compound (A) is a transition metal compound having two ligands bearing conjugated π-electrons.

33. The process of claim 13, wherein said transition metal compound (A) is a transition metal compound having two ligands bearing conjugated π-electrons.

* * * * *